United States Patent [19]
Young

[11] Patent Number: 5,662,803
[45] Date of Patent: Sep. 2, 1997

[54] STABILIZERS FOR ADDITIVES IN AQUEOUS SYSTEMS CONTAINING OZONE

[75] Inventor: Paul R. Young, Wheaton, Ill.

[73] Assignee: Nalco Chemical Company, Naperville, Ill.

[21] Appl. No.: 629,671

[22] Filed: Apr. 9, 1996

[51] Int. Cl.$^6$ ...................................................... C02F 5/14
[52] U.S. Cl. .......................... 210/698; 210/699; 210/701; 210/760; 252/180; 252/181; 422/15; 422/17
[58] Field of Search ............................... 210/698–701, 210/750, 757, 760; 252/180, 181; 422/16–18, 15

[56] References Cited

U.S. PATENT DOCUMENTS

| | | | |
|---|---|---|---|
| 2,264,103 | 11/1941 | Tucker | 210/698 |
| 4,032,460 | 6/1977 | Zilch et al. | 210/698 |
| 4,532,047 | 7/1985 | Dubin | 210/698 |
| 4,711,724 | 12/1987 | Johnson | 210/699 |
| 4,975,202 | 12/1990 | Fillipo et al. | 210/698 |
| 5,171,451 | 12/1992 | Khambatta et al. | 210/701 |
| 5,180,498 | 1/1993 | Chen et al. | 210/698 |
| 5,415,783 | 5/1995 | Johnson et al. | 210/699 |
| 5,449,476 | 9/1995 | Cherbondy et al. | 525/180 |

OTHER PUBLICATIONS

Degradation Rate of Water–Soluble Polymers by Ozone, K. Ikemizu et al., Chem. Eng. Commun. vol. 34 pp. 77–85.
Ozone Treatment of Water–Soluble Polymers. V. Ultraviolet Irradiation Effects on the Ozonization of Polyacrylamide, J. Suzuki et al. Journal of Applied Polymer Science. vol. 24, 999–1006 (1979).
Ozone Treatment. of Cooling Water: Results of a Full–Scale Performance Evaluation, Coppinger et al., 1989 Cooling Tower Institute Annual Meeting., New Orleans, LA 1/23–35/89.
Hanasaki, in Kankyo Gijutsu, 13 (11), 817–20, (1984).
Degradation of Water–Soluble Polymers by Ozone, S. Morooka et al. Proc. Pacific Chem. Eng. Congress 3rd 1983.
The Use of Ozone in Bleaching Pulps, N. Liebergott et al. 1992 Environmental Conference.
Towards Development of an Ozone Compatible Cooling Water Treatment, Narashimha M. Rao, Corrosion 94, NACE International, No. 469.
Small–Scale Short–Term Methods of Evaluating Cooling Water Treatments–Are They Worthwhile?, D. T. Reed et al., Nalco Chemical Company.
UV–Irradiated Ozonation of Water–Soluble Polymers, S. Imamura, et al. Journal of Applied Polymer Science, vol. 25, 997–1005 (1980).

*Primary Examiner*—Peter A. Hruskoci
*Attorney, Agent, or Firm*—Robert A. Miller; James J. Drake

[57] ABSTRACT

The invention is a method for increasing the effectiveness of water-soluble polymeric additives or water-soluble phosphonates in the recirculating water of processing equipment wherein said water contains ozone and water-soluble polymeric additives or water-soluble phosphonates comprising the step of adding an effective amount of a stabilizer to said waters. The invention is also a method for increasing the effectiveness of ozone treatment in the recirculating waters of processing equipment wherein said water contains ozone and water-soluble additives comprising the step of adding an effective amount of a stabilizer to said waters.

18 Claims, 1 Drawing Sheet

STABILIZERS FOR ADDITIVES IN AQUEOUS SYSTEMS CONTAINING OZONE

FIELD OF THE INVENTION

The invention is a method for increasing the effectiveness of water-soluble polymeric additives or water-soluble phosphonates in the recirculating water of processing equipment wherein said water contains ozone and water-soluble polymeric additives or water-soluble phosphonates comprising the step of adding an effective amount of a stabilizer to said waters. The invention is also a method for increasing the effectiveness of ozone treatment in the recirculating waters of processing equipment wherein said water contains ozone and water-soluble additives comprising the step of adding an effective amount of a stabilizer to said waters.

BACKGROUND OF THE INVENTION

The use of ozone in cooling waters, particularly recirculating cooling waters has been recently touted as an answer to control microbiological growth in these recirculating waters, and is also now being touted as a sole treatment including possible inhibition of corrosion and for scale inhibition.

A typical ozone injection system for cooling water systems includes a source of dry, clean compressed air or oxygen which is passed through an ozone generator.

Depending on the type of ozone generator used, a stream containing 1-30% ozone in air is generated. Ozone is typically produced in a gas phase either by exposing the gas phase to electrical energy in the form of a corona discharge, by electrochemical processes or through other means.

Under current practice, ozone is introduced into an aqueous system by passing a side stream of the system through a gas/liquid contactor in which ozone is transferred from a gas phase to the aqueous phase (contactor loop).

This gas stream is then passed into a contractor in which the ozone laden gas stream is intimately mixed with an aqueous stream (the contactor loop). This aqueous contactor stream is generally a side stream loop of the recirculating system. The same principle would apply to contacting cooling system make-up water and the term sidestream contactor loop as used herein is meant to also apply to the introduction of ozone into cooling system makeup water. Ozone is dissolved in the recirculating system loop (contactor loop) from the gas stream resulting in an ozone rich aqueous stream which is then reinjected into the cooling waters. The ozone concentration in the aqueous sidestream ozone contactor loop can be quite high. Since dissolved ozone is quite unstable and reactive, significant amounts of ozone can be lost in the contactor loop. Coppinger et. at., *Ozone Treatment of Cooling Water:Results of a Full-Scale Performance Evaluation*, presented at the 1989 Cooling Tower Institute Annual Meeting, New Orleans, La., Jan. 23-25, 1989 demonstrated that 88% of the ozone produced by the generator can be lost in the contactor loop. Efforts have been made to increase the effectiveness of ozone as a treating agent for alkaline cooling tower waters. This was accomplished by reducing the pH of the solutions in contactor loops which supply ozone to cooling tower waters with an acidic substance in Johnson et al., U.S. Pat. No. 5,415,783.

Normally, certain additives are added to cooling waters, particularly those cooling waters that have characteristics that might lead to hardness precipitates such as calcium and/or magnesium carbonate precipitates, to prevent these precipitates from accumulating and depositing on heat transfer surfaces, fouling these surfaces and contributing to lost energy efficiency in the process. Since ozone is such a strong oxidizing agent, there are many references to its reacting with organic materials, including agents purposefully added as scale inhibitors, to degrade organics. Such degradation eliminates any scale inhibiting characteristics that might be present when scale inhibitor chemicals are being used.

Examples of these teachings include a teaching by Ikemizu, et. al., Chemical Engineer Commun., 34(1-6), 77-85, 1985, wherein water soluble polymers are taught to be degraded by ozone and that the degradation rate is defined by change in the weight average molecular weight per unit time. Ikemizu teaches that the rate of degradation for poly (oxyethylenes) was proportional to 1.5 to 2.0 powers of the molecular weight and was 20 to 60 times higher than the rate of degradation of poly(acrylamides). He taught that the degradation rate of poly(sodium acrylate) was proportional to the 2.0 power of the molecular weight.

Hanasaki, in Kankyo Gijutsu, 13(11), 817-20, (1984), taught that poly(acrylamide) was ozonized to remove it from waste waters. His observations indicated that chain severing occurred in a random fashion and that ozonation produced a carbonyl(aldehyde), carboxylate functionalities and ketone groups. Although he states that the amide groups in poly (acrylamide) were not themselves attacked by ozone, these teachings and others, such as Imamura, et. al., in the Journal of Applied Polymer Science (25(6), 997-1105, (1980), taught destruction of polymers and UV light acceleration of ozonation of water soluble polymers, particularly polyethylene glycol, polyacrylamide, and poly(vinyl alcohol).

In general, chain cleavage of polymers was observed in the presence of ozone, and this was accelerated in the presence of UV irradiation. Various products were observed in the ozonation reaction including formaldehyde and the presence in oligomers of ketones, carboxylic acids, and terminal aldehydes. (See for example Suzuki, et. al., Journal Applied Polymer Science, 24(4), 999-1006, (1979.)

It is well known that ozonation causes polymer degradation containing various water soluble polymers. (See for example, Morooka, S. et al., Proc. Pacific Chem. Eng. Congress 3rd, 289-294 (1983).)

It would have appeared then from these various treatments appearing in the prior art that water soluble polymers traditionally used to maintain calcium and other hardness components in solution in recirculating cooling waters would suffer a negative fate in the presence of ozone. Ozone would be expected to degrade these polymers to the point where their usefulness would no longer exist for the purpose of maintaining calcium carbonate in solution or suspension and preventing scale formation on heat transfer surfaces in contact with the waters containing hardness. Therefore, the ability to increase the stability of water-soluble polymeric treating agents in the presence of ozone as detailed in this invention is of great utility.

Ozone has been utilized for the bleaching of pulp in the pulp and paper industry. Since ozone is known to be an indiscriminant oxidizer of wood pulp, attempts have been made to identify conditions wherein ozone-lignin interactions are maximized and ozone-carbohydrate interactions are minimized. It has been disc additives, such as methanol and dimethyl sulfoxide can "protect" cellulose during ozone delignification. Liebergott, N.; Skothos, A.; van Lierop, B. *The Use of Ozone in Bleaching Pulps,* 1992 Environmental Conference, TAPPI Proceedings, 1992, p. 1105-1127. However, this finding represents a conclusion only that certain organic additives may protect one organic component (cellulose) preferably to another (lignin), not that a wide variety of organic compounds may be protected successfully. By contrast, this invention demonstrates that classes of organic compounds such its water soluble polymeric additives or phosphonates can be protected from significant degradation in an environment which contains ozone.

Conventional approaches to the problem of ozone degradation of water treatment chemicals in cooling towers have involved the screening of treating agents to determine which were relatively more ozone-resistant. Rao, Narishma M., *Towards Development of An Ozone Compatible Cooling Water Treatment*, NACE Conference 1994, Paper No. 469. Screening techniques were also used by Khambatta, et al., U.S. Pat. No. 5,171,451 to determine which water-soluble treatment polymers were inherently more ozone resistant, and thus more compatable treating agents in ozone-containing systems.

An analogous problem is experienced in aqueous systems which involve chlorine or bromine as biocides. Because of the reactivity of these biocides, the effectiveness of other water-treatment agents is severely reduced. Protection for specific water-treating agents such as scale inhibiting phosphonates in the presence of chlorine or bromine biocides by addition of organic sulfonamides was taught in U.S. Pat. No. 5,449,476. These, however, are believed to form halogenated organic intermediates similar to choramines and are not analogous to the present invention. In fact, methane sulfonamide was found to be ineffective in Example 2.

It is evident that past solutions to the degradative tendencies of certain biocides such as ozone involve the selection of specific additives which are more resistant, or protection of certain limited classes of additives with a specific organic reagent. Thus, an effective treatment which may protect a whole class of additives, regardless of individual ozone susceptibilities would be highly desirable. It is this end which the invention has successfully addressed.

SUMMARY OF THE INVENTION

The invention is a method for increasing the effectiveness of water-soluble polymeric additives or water-soluble phosphonates in the recirculating water of processing equipment wherein said water contains ozone and water-soluble polymeric additives or water-soluble phosphonates comprising the step of adding an effective amount of a stabilizer to said waters. The invention is also a method for increasing the effectiveness of ozone treatment in the recirculating waters of processing equipment wherein said water contains ozone and water-soluble additives comprising the step of adding an effective amount of a stabilizer to said waters.

DESCRIPTION OF THE INVENTION

Figure 1:
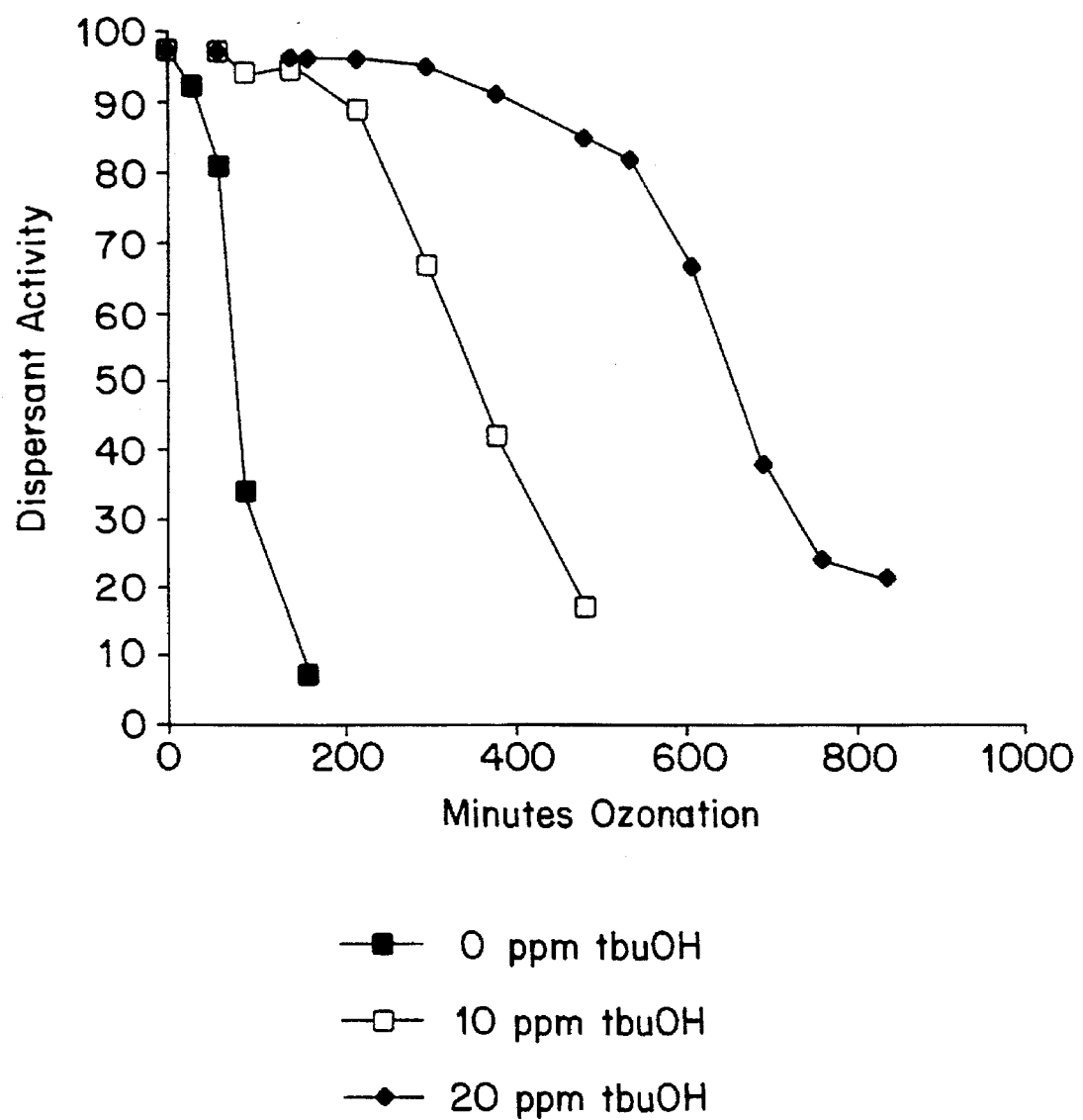
FIG. 1 represents the stabilizing effect of t-butanol on polymers in the presence of ozone at varying concentration levels.

A method for increasing the effectiveness of a water-soluble polymeric additive in an aqueous system wherein the aqueous system containing the polymeric additive is treated with ozone which comprises the step of adding to the aqueous system an effective amount of a compound selected from the group consisting of alkyl alcohols having at least four carbon atoms, alkyl carboxylic acids, alkyl amides, alkylamines, dimethyl sulfoxide, lauryl sulfate, and combinations thereof to said waters. As used herein, the term stabilizer refers to an organic compound which does not directly consume substantial amounts of ozone and which when added to the ozone-containing aqueous system, protects a water-treatment chemical such as a water-soluble polymeric additive or a water-soluble phosphonate from experiencing degradation.

The processing equipment may be a cooling tower. Other examples of processing equipment useful in this invention include once-through cooling units, wastewater oxidation equipment and food processing equipment. The compound may be added to the cooling tower waters in the contact loop at a point prior to or simultaneously with the addition of ozone into the contact loop. The effective amount of the compound to be added will be dependent upon the amount and type of the particular water-soluble polymeric treatment additive to be protected, as well as the compound selected and the conditions within the specific processing equipment. Moreover, the order of addition of the ozone, water-soluble polymeric additive and compound will depend upon the type of processing equipment which these reagents are added to.

Furthermore, the alkyl alcohol having at least four carbon atoms may be selected from the group consisting of t-butanol, t-amyl alcohol, pinacol, 1,6-hexane diol, n-butoxyethanol, 1,-12 dodecanediol, t-butyl amine ethanol and n-butanol. The alkyl carboxylic acid may be selected from the group consisting of succinic acid, propionic acid, adipic acid, citric acid, 2-hydroxy isobutyric acid, trimethyl acetic acid, N-t-butoxy carbonyl glycine and acetic acid. The alkylamine may be t-butylamine. The alkylamide may be selected from the group consisting of t-butyl formamide and dimethyl formamide. The ratio of water-soluble polymeric additive to compound may be from about 1:10 to about 10:1.

The water-soluble polymeric additives are preferably organic water-soluble vinylic polymers containing at least 50 mole percent of (meth)acrylic acid. As used herein, the term (meth)acrylic acid or its salts indicates exclusively acrylic acid monomer, exclusively methacrylic acid monomer, or any admixture of acrylic acid and methacrylic acid monomers, whether present as the free acid or partially neutralized salt or completely neutralized salt of these free acids. To form the salts, any common base alkali metal or alkaline earth metal, ammonia, low molecular weight amine, or low molecular weight quaternary salt may be used. The organic water-soluble vinylic polymers may contain at least 50 mole percent (meth)acrylic acid and can also contain at least one of the following comonomers selected from the group consisting of: acrylamide, maleic anhydride, vinyl sulfonic acid, itaconic acid, $C_1$-$C_3$ esters of acrylic acids, hydroxypropylacrylate, N-t-butyl acrylamide, vinyl acetate, vinyl ethers, and other similar vinylic monomers which are successfully polymerized with acrylic acid, methacrylic acid, or mixtures thereof.

Specific examples of water-soluble polymeric additives which may have increased efficiencies due to the method of this invention are: poly(acrylic acid), poly(methyl acrylate), poly(acrylic acid/acrylamide/aminomethane sulfonic acid), poly(acrylic acid/n-t-butylacrylamide/acrylamido methyl propane sulfonic acid), poly(acrylic acid/n-t-butylacrylamide), poly(acrylic acid/hydroxypropylacrylate), and poly(acrylic acid/aminoethane sulfonic acid).

A method for increasing the effectiveness of a water-soluble phosphonate in an aqueous system wherein the aqueous system containing the water-soluble phosphonate is treated with ozone which comprises the step of adding to the aqueous system an effective mount of a compound selected from the group consisting of alkyl alcohols having at least four carbon atoms, alkyl carboxylic acids, alkyl amides, alkylamines, dimethyl sulfoxide, lauryl sulfate, and combinations thereof to said waters.

The processing equipment may be a cooling tower. Other examples of processing equipment useful in this invention include once-through cooling units, wastewater oxidation equipment and food processing equipment.

The compound may be added to the cooling tower waters in the contact loop at a point prior to or simultaneously with the addition of ozone into the contact loop.

The alkyl alcohol having at least four carbon atoms may be selected from the group consisting oft-butanol, t-amyl alcohol, pinacol, 1,6-hexane diol, n-butoxyethanol, 1,-12 dodecanediol, t-butyl amino ethanol and n-butanol. The alkyl carboxylic acid may be selected from the group consisting of succinic acid, propionic acid, adipic acid, citric acid, 2-hydroxy isobutyric acid, trimethyl acetic acid, N-t-butoxy carbonyl glycine and acetic acid. The alkylamine may be t-butylamine. The alkylamide may be selected from the group consisting of t-butyl formamide and dimethyl formamide. The ratio of water-soluble phosphonate to compound may be from about 1:10 to about 10:1.

Among the phosphonates which may have increased efficiencies due to the method of this invention are: phosphonobutane tricarboxylic acid, hydroxyethylidene diphosphonic acid and hexamethyl diamino tetrakis (methylene phosphortic acid).

A method for increasing the effectiveness of ozone treatment in an aqueous system wherein the aqueous system contains ozone and water-soluble additives, which comprises the step of adding to the aqueous system an effective amount of a compound selected from the group consisting of alkyl alcohols having at least four carbon atoms, alkyl carboxylic acids, alkyl amides, alkylamines, dimethyl sulfoxide, lauryl sulfate, and combinations thereof to said waters.

The water-soluble additives may be selected from the group consisting of water-soluble phosphonates and water-soluble polymers. These include, but are not limited to those compounds described above.

The processing equipment may be a cooling tower. Other examples of processing equipment useful in this invention include once-through cooling units, wastewater oxidation equipment and food processing equipment.

The compound may be added to the cooling tower waters in the contact loop at a point prior to or simultaneously with the addition of ozone into the contact loop. The effective amount of the compound to be added will be dependent upon the amount and type of the particular water-soluble phosphonate to be protected, as well as the compound selected and the conditions within the specific processing equipment. Moreover, the order of addition of the ozone, water-soluble phosphonate and compound will depend upon the type of processing equipment which these reagents are added to.

The compound may be selected from the group consisting of alkyl alcohols having at least four carbon atoms, alkyl carboxylic acids, alkyl amides, alkylamines, dimethyl sulfoxide, lauryl sulfate and combinations thereof. The alkyl alcohol having at least four carbon atoms may be selected from the group consisting oft-butanol, t-amyl alcohol, pinacol, 1,6-hexane diol, n-butoxyethanol, 1,-12 dodecanediol, t-butyl amino ethanol and n-butanol. The alkyl carboxylic acid may be selected from the group consisting of succinic acid, propionic acid, adipic acid, citric acid, 2-hydroxy isobutyric acid, trimethyl acetic acid, N-t-butoxy carbonyl glycine and acetic acid. The alkylamine may be t-butylamine. The alkylamide may be selected from the group consisting of t-butyl formamide and dimethyl formamide. The ratio of water-soluble polymeric additive to compound may be from about 1:10 to about 10:1.

The following examples are presented to describe preferred embodiments and utilities of the invention and are not meant to limit the invention unless otherwise stated in the claims appended hereto.

Example 1

The test was performed by utilizing a recirculating heat exchange apparatus, similar to that described by Reed et at., in *Proc. Int'l. Water Conf.*, 1975 as a reaction vessel. The basin of the vessel is filled with 50 liters of water containing 20 ppm as actives of a dispersant polymer. The polymer tested was a 60:25:15 mole ratio poly(acrylic acid/acrylamide/acrylamidomethane sulfonic acid). The water also contains 600 ppm calcium and 300 ppm magnesium (both as $CaCO_3$), 10 ppm phosphoric acid and 25 ppm sodium bicarbonate to simulate a cooling tower aqueous environment. The pH is maintained at 7. During the course of the experiment, deionized water is added to compensate for evaporation.

Ozone was introduced to the water by bubbling the output of an ozonator through the basin. Samples of the water were taken at regular intervals. The stability of the dispersant polymer was measured by heating the samples and increasing their pH to 8.5. The samples were filtered and analyzed for residual phosphate by a standard test which utilizes a molybdate reagent. The residual phosphate as a percentage of the initial phosphate is reported as "percent inhibition", indicated as Dispersant Activity in FIG. 1. Lower percent inhibition indicates loss of polymer activity.

The untreated blank exhibited loss of polymer activity within 90 minutes. The test was repeated with the addition of 10 ppm t-butanol at the beginning of the test, and an additional 10 ppm fed by syringe pump between 1 and 5 hours of ozonation. The polymer retained its activity for about 4 hours. Doubling the t-butanol concentration gave an even longer lifetime, roughly 9 hours. The results are illustrated in FIG. 1. This Example illustrates that t-butanol is effective at increasing the stability of a polymer in the presence of ozone. Similar results were obtained with acetate and propionate.

Example 2

The results of Table I were obtained in the following fashion. For each test, three equal aliquots of a stock solution were placed in jars in a 35° C. constant temperature bath. The stock solution consisted of 600 mg Ca, 300 mg Mg, 50 mg $HCO_3$, 10 ppm $H_3PO_4$ and 20 ppm poly(acrylic acid/acrylamide/acrylamide methane sulfonic acid). Ozone from a commercial benchtop ozonator was split into three equal streams. Calibrated gas flow meters were utilized to ensure equal flow in each stream. The ozone was bubbled through the three samples for 60 minutes while pH was maintained at 7.1. Two of the samples contained candidate stabilizers, while the third was a blank. The control runs represent the stock solution without ozonation, while the blank runs represent the stock solution which is ozonated but not treated with any stabilizer. After ozonation, the volume was brought back up to 500 ml to compensate for evaporation, and the samples were measured for residual polymer by an antibody test.

The results show that in the presence of various stabilizers, the amount of measurable polymer is increased in comparison to the blank.

TABLE I

| Stabilizer | Stabilizer (ppm) | O$_3$ consumed | % O$_3$ 90 sec | % O$_3$ min | Polymer (ppm) | ppm Polymer in Control | % Stabilization |
|---|---|---|---|---|---|---|---|
| control | | | | | 18.70 | 18.70 | 100.00 |
| blank | 0 | | | | 6.95 | 18.70 | 37.17 |
| Pinacol | 20 | nil | | | 15.70 | 18.70 | 83.96 |
| t-butanol | 20 | nil | 81 | 65 | 13.20 | 18.70 | 70.59 |
| control | | | | | 19.95 | 19.95 | 100.00 |
| t-Amyl Alcohol | 40 | | | | 20.05 | 19.95 | 100.50 |
| t-Butyl Amino Ethanol | 48 | | | | 8.40 | 19.95 | 42.11 |
| blank | 0 | | | | 5.10 | 19.95 | 25.56 |
| Citrate[1] | 75 | low | | | 13.05 | 19.95 | 65.41 |
| blank | 0 | | | | 6.50 | 19.95 | 32.58 |
| t-Butyl Formamide | 40 | nil | | 66 | 24.05 | 19.95 | 120.55 |
| control | | | | | 27.40 | 27.40 | 100.00 |
| blank | 0 | | | | 0.00 | 27.40 | 0.00 |
| Poly(Methacrylic Acid) | 20 | | | | 3.90 | 27.40 | 14.23 |
| Sulfamate | 40 | | | | 4.20 | 27.40 | 15.33 |
| 1:1:1 Succinic Acid:Malonic Acid:Sorbitol | 64 | low | | | 15.60 | 27.40 | 56.93 |
| blank | 0 | | | | 5.70 | 27.40 | 20.80 |
| t-Butyl Amine (Neutralized to pH 7 with HCl) | 40 | | | | 10.00 | 27.40 | 36.50 |
| Triethanol Amine | 40 | high | 0 | | 16.90 | 27.40 | 61.68 |
| n-butanol | 40 | nil | | | 19.55 | 27.40 | 71.35 |
| blank | 0 | | | | 7.10 | 27.40 | 25.91 |
| control | | | | | 40.50 | 40.50 | 100.00 |
| blank | 0 | | | | 1.46 | 40.50 | 3.60 |
| citrate[1] | 20 | low | 81 | 42 | 5.25 | 40.50 | 12.96 |
| 1:1:1 Succinic Acid:Malonic Acid:Sorbitol | 24 | low | 87 | 55 | 11.00 | 40.50 | 27.16 |
| control | | | | | 46.00 | 46.00 | 100.00 |
| n-butanol | 20 | nil | 84 | 65 | 19.55 | 46.00 | 42.50 |
| blank | 0 | | | | 1.30 | 46.00 | 2.83 |
| 1:1:1 Methanol: Glycerol: Isopropanol | 21 | mod | 15 | | 19.90 | 46.00 | 43.26 |
| blank | 0 | | | | 2.20 | 46.00 | 4.78 |
| Phosphonobutane Tricarboxylic Acid | 20 | | | | 10.20 | 46.00 | 22.17 |
| Triethanol Amine | 20 | high | 0 | | 17.70 | 46.00 | 38.48 |
| control | | | | | 32.70 | 32.70 | 100.00 |
| Fe + 2 | 1 | high | | | 3.00 | 32.70 | 9.17 |
| 2 Hydroxy Isobutyric Acid | 22 | | | | 13.65 | 32.70 | 41.74 |
| blank | 0 | | | | 0.57 | 32.70 | 1.74 |
| Tolyltriazole | 20 | high | 0 | | 19.00 | 32.70 | 58.10 |
| blank | 0 | | | | 0.89 | 32.70 | 2.72 |
| Trimethyl Acetic Acid | 20 | | | | 20.15 | 32.70 | 61.62 |
| control | | | | | 34.30 | 34.30 | 100.00 |
| Acetate[1] | 20 | nil | 85 | 73 | 19.40 | 34.30 | 56.56 |
| Monoethanol Amine | 20 | high | 0 | | 0.00 | 34.30 | 0.00 |
| blank | 0 | | | | 1.90 | 34.30 | 5.54 |
| Hydroxyethane Diphosphonic Acid | 20 | | | | 7.10 | 34.30 | 20.70 |
| Diethyl Hydroxylamine | 20 | | | | 7.90 | 34.30 | 23.03 |
| blank | 0 | | | | 1.58 | 34.30 | 4.61 |
| blank | 0 | | | | 1.30 | 34.30 | 3.79 |
| Formate[1] | 18 | high | 0 | | 5.10 | 34.30 | 14.87 |
| Borate[1] | 23 | | | | 1.50 | 34.30 | 4.37 |
| Lauryl Sulfate | 20 | nil | 87 | 68 | 22.10 | 34.30 | 64.43 |
| Pinacol | 20 | nil | | | 14.30 | 34.30 | 41.69 |
| blank | 0 | | | | 1.30 | 34.30 | 3.79 |
| control | | | | | 36.50 | 36.50 | 100.00 |
| blank | 0 | | | | 2.30 | 36.50 | 6.30 |
| dimethyl formamide | 20 | low | | | 29.90 | 36.50 | 81.92 |

TABLE I-continued

| Stabilizer | Stabilizer (ppm) | O₃ consumed | % O₃ 90 sec | % O₃ min | Polymer (ppm) | ppm Polymer in Control | % Stabilization |
|---|---|---|---|---|---|---|---|
| antifoam² | 20 | | | | 2.70 | 36.50 | 7.40 |
| adipate | 20 | nil | 86 | 54 | 30.80 | 36.50 | 84.38 |
| dodecanediol | 20 | | | | 21.30 | 36.50 | 58.36 |
| blank | 0 | | | | 1.50 | 36.50 | 4.11 |
| oxalate¹ | 20 | nil | | | 1.50 | 36.50 | 4.11 |
| blank | 0 | | | | 1.90 | 36.50 | 5.21 |
| malonate¹ | 20 | low | 76 | 49 | 1.00 | 36.50 | 2.74 |
| propionate¹ | 20 | nil | 84 | 55 | 34.30 | 36.50 | 93.97 |
| dimethyl sulfoxide | 20 | nil | 80 | 58 | 41.30 | 36.50 | 113.15 |
| blank | 0 | | | | 0.30 | 36.50 | 0.82 |
| control | 0 | | | | 44.30 | 44.30 | 100.00 |
| blank | 0 | | | | 1.60 | 44.30 | 3.61 |
| isopropanol | 20 | mod | 39 | 3 | 27.20 | 44.30 | 61.40 |
| succinate¹ | 20 | nil | 84 | 62 | 29.50 | 44.30 | 66.59 |
| butyl cellosolve | 20 | nil | 81 | 62 | 32.80 | 44.30 | 74.04 |
| butylene glycol | 20 | mod | 58 | 21 | 21.30 | 44.30 | 48.08 |
| methane sulfonate | 20 | nil | 75 | 61 | 2.00 | 44.30 | 4.51 |
| hexane diol | 20 | low | 68 | 43 | 22.10 | 44.30 | 49.89 |
| dimethyl sulfoxide | 10 | nil | 80 | 58 | 27.50 | 44.30 | 62.08 |
| urea | 20 | low | 85 | 47 | 1.50 | 44.30 | 3.39 |
| control | | | | | 27.40 | 27.40 | 100.00 |
| acetone | 20 | nil | 86 | 57 | 9.70 | 27.40 | 35.40 |
| propionate¹ | 10 | | | | 33.70 | 27.40 | 122.99 |
| Dimethyl sulfoxide | 5 | | | | 21.70 | 27.40 | 79.20 |
| methane sulfonamide | 20 | | | | 1.4 | 21.1 | 6.64 |
| N-t-butoxy carbonyl glycine | 20 | | | | 14.1 | 21.1 | 66.82 |

¹ = sodium salt
² = commercially available from Nalco Chemical Co.; Naperville, IL

Example 3

The method described in Example 2 was modified to test evaluate the stabilization of organophosphonates. Common agents for scale and corrosion control in cooling water systems were tested. Individual solutions of PBTC (phosphono butane tricarboxylic acid), HEDP (hydroxy ethane diphosphonic acid), and HMDTMP (hexamethylene diamine tetrakis(methylene phosphonic acid)) were prepared. These were split, treated with stabilizers as listed in Table II, and ozonated as described in Example 2. 20 ppm of each stabilizer was tested. PBTC is known to be the most resistant to ozone, so it was ozonated most heavily. The amine-containing HMDTMP breaks down the fastest, so it was ozonated the least. The organic phosphate levels in the solutions were then measured.

Table II shows that the stabilizers tested improved the survival of the phosphonates. To elaborate, for phosphonate A, initially 9 ppm of phosphonate was measured. With no protection by the addition of a stabilizer, after 50 minutes of ozonation, only 4.7 ppm of phosphonate remains. In the presence of stabilizers, considerably more phosphonate remains after 50 minutes of ozonation. Furthermore, roughly half the organic phosphate broke down without stabilizers, while only 15–35% of phosphonate was lost in the presence of the stabilizers.

TABLE II

Stabilizing Phosphonates in the Presence of Ozone

| Phosphonate | Ozonator Rate (mg/min) | Ozonation Time (min.) | Stabilizer | Phosphonate (ppm) |
|---|---|---|---|---|
| A | 0 | Initial | None | 9.0 |
| A | 13 | 50 | None | 4.7 |
| A | 13 | 50 | DMF | 7.8 |
| A | 13 | 50 | TBF | 7.6 |
| B | 0 | Initial | None | 19.3 |
| B | 9 | 60 | None | 8.4 |
| B | 9 | 60 | TBF | 13.0 |
| B | 9 | 60 | TMA | 14.7 |
| C | 0 | Initial | None | 4.7 |
| C | 5 | 20 | None | 2.5 |
| C | 5 | 20 | TBF | 3.2 |
| C | 5 | 20 | Antifoam | 3.4 |

A = Phosphono Butane Tricarboxylic Acid
B = Hydroxy Ethylidene Disphosphonic Acid
C = Hexamethylene Diamine Tetrakis (Methylene Phosphonic Acid)
TBF = t-Butyl Formamide
DMF = Dimethyl Formamide
TMA = Trimethyl Acetic Acid
Antifoam = Silica, Hydrocarbon, Polyglycol

Example 4

A modification of the method described in Example 1 was used to test indirectly the effect of stabilizers upon various dispersant polymers in the presence of stabilizers. Ozone concentration in the recirculating water was monitored by either or both of two commercially available analyzers. One is a Nova amperometric analyzer for oxidizers (Model 440WF), the other is an Orbisphere electrochemical ozone analyzer utilizing a semipermeable membrane (Model 26506).

At the outset, the ozone residual was high (0.05–0.1 ppm as $O_3$), but decreased to 0.00–0.03 ppm over the course of time (30–90 minutes). This decrease of ozone residual generally can be correlated with the loss of polymer activity.

The results suggest that the polymers react slowly with ozone, but once the reaction starts, intermediate products form which are much more reactive. Therefore an increase in ozone residual, as ozone is continually introduced to the system containing polymer, would mean that more ozone was available to act as a biocide. Additionally, it would indicate that less ozone has attacked polymer. In Example 1, the addition of t-butanol allowed ozone residual to remain above 0.06 ppm throughout the test, even after 6–10 hours.

The method of Example 1 was usually used without stabilizers, but with different polymers. In some cases, instead of stopping the test after 3–5 hours, stabilizers were added to the test vessel. If the stabilizers retard the reaction of ozone with the reactive intermediates, the measured ozone concentration should increase. This provides indirect evidence of stabilization. For example, when 10 ppm t-butanol was added to the test unit, the ozone residual increased from 0.01 ppm to 0.07 ppm within 15 minutes.

Table III summarizes the results, and also demonstrates an added benefit of the stabilizers herein disclosed to ozone concentration. The positive changes in ozone residual upon addition of stabilizer are indicated by Table III, it may be concluded that the concentration of ozone in the water increases, thus increasing its biocidal effectiveness as illustrated by Example 5. These results are consistent with the more extensive testing in Example 2.

TABLE III

| Polymer | $O_3$ resid (ppm) | Stabilizer | Stabilizer (ppm) | $O_3$ final (ppm) | Change in $O_3$ residual (ppm) |
|---|---|---|---|---|---|
| C | 0.01 | t-buOH | 10 | 0.07 | +0.06 |
| C |  | t-buOH | 20 | 0.09 | +0.08 |
| D at pH 8.4 | 0.09 | t-buOH | 10 | 0.11 | +0.02 |
| D at pH 8.4 | 0.09 | t-buOH | 30 | 0.13 | +0.04 |
| G | 0.01 | i-propanol | 20 | 0.02 | +0.01 |
| G | 0.02 | i-propanol | 100 | 0.01 | −0.01 |
| F | 0 | gluconate | 10 | 0 | same |
| F | 0 | gluconate | 50 | 0 | same |
| E | 0.07 | borax | 50 | 0.08 | +0.01 |
| E | 0.08 | boric acid | 20 | 0.08 | same |
| E | 0.08 | sulfamic acid | 25 | 0.1 | +0.02 |
| D + sulfamate | 0.03 | pinacol | 10 | 0.1 | +0.07 |
| D | 0.04 | ethanol | 50 | 0.04 | same |
| D | 0.04 | glycol | 60 | 0.01 | −0.03 |
| D | 0.01 | hydroxylamine | 10 | neg | down |
| D | 0.01 | A | 30 | 0.01 | same |
| D | 0.01 | $Zn/Sn+^2$ | 10 | neg | down |
| H | 0.02 | B | 15 | 0.04 | +0.02 |

A = 1:1:1 Succinic Acid:Malonic Acid:Sorbitol
B = t-butyl ammonium chloride
C = poly(methyl acrylate)
D = poly(acrylic acid/acrylamide/aminomethane sulfonic acid) in a 60/25/15 mole ratio
E = poly(acrylic acid/n-t-butylacrylamide/acrylamido methyl propane sulfonic acid) in a 65/15/20 mole ratio
F = poly(acrylic acid/n-t-butylacrylamide) in an 85/15 mole ratio
G = poly(acrylic acid/hydroxypropylacrylate) in a 70/30 mole ratio
H = poly(acrylic acid/acrylamide/aminoethane sulfonic acid) in a 60/20/20 mole ratio Example 5

Two liters of dilute phosphate solution was ozonated to 1.1–1.2 ppm $O_3$. Ozonation was then stopped. A solution containing a culture of pseudomonas aeruginosa was added. Samples were taken periodically and quenched with thiosulfate. "Zero" time was an equivalent dilution of the bacterial culture with un-ozonated buffer. The experiment was repeated with the addition of 10 ppm propionate. Table IV shows that the ozone residual dropped more slowly in the presence of propionate, and biocidal effectiveness was greater.

TABLE IV

| Additive | Time, (sec) | ppm $O_3$ | pH | Easi-Cult CFU/ml |
|---|---|---|---|---|
| none | 0 | 1.1 | 7.02 | >10\*\*7 |
| none | 30 | 0.35 | 7 | 10\*\*4 |
| none | 60 | 0.15 | 6.9 | 10\*\*5 |
| none | 90 | 0.06 | 6.89 | 10\*\*5 |
| none | 150 | 0.02 | 6.85 | 10\*\*4 |
| propionate, 10 ppm | 0 | 1.2 | 7.06 | >10\*\*7 |
| propionate | 30 | 0.58 | 7.01 | nil |
| propionate | 60 |  |  | nil |
| propionate | 90 | 0.18 | 6.98 | nil |
| propionate | 150 | 0.04 | 6.97 | nil |

Changes can be made in the composition, operation and arrangement of the method of the present invention described herein without departing from the concept and scope of the invention as defined in the following claims:

I claim:

1. A method for increasing the effectiveness of a water-soluble polymeric additive in an aqueous system being treated with ozone, wherein an effective amount of ozone is added to the aqueous system to control microbiological growth, and an effective amount of the polymeric additive is added to the aqueous system to prevent hardness precipitation, which comprises the step of adding to the aqueous system being treated with ozone and containing said water-soluble polymeric additive an effective amount of a compound in a weight ratio of from about 1:10 to about 10:1 of said polymeric additive to said compound selected from the group consisting of alkyl alcohols having at least four carbon atoms, alkyl carboxylic acids, alkyl amides, alkylamines, dimethyl sulfoxide, lauryl sulfate, and combinations thereof.

2. The method of claim 1 wherein the aqueous system is a cooling tower.

3. The method of claim 2 wherein the compound is added to the cooling tower waters in the contact loop at a point prior to or simultaneously with the addition of ozone into the contact loop.

4. The method of claim 1 wherein the alkyl alcohol having at least four carbon atoms is selected from the group consisting of t-butanol, t-amyl alcohol, pinacol, 1,6-hexane diol, n-butoxyethanol, 1,-12 dodecanediol, t-butyl amino ethanol and n-butanol.

5. The method of claim 1 wherein the alkyl carboxylic acid is selected from the group consisting of succinic acid, propionic acid, adipic acid, citric acid, 2-hydroxy isobutyric acid, trimethyl acetic acid, N-t-butoxy carbonyl glycine and acetic acid.

6. The method of claim 1 wherein the alkylamine is t-butylamine.

7. A method for increasing the effectiveness of a water-soluble phosphonate in an aqueous system being treated with ozone, wherein an effective amount of ozone is added to the aqueous system to control microbiological growth, and an effective amount of the phosphonate is added to the aqueous system to prevent hardness precipitation, which comprises the step of adding to the aqueous system being treated with ozone and containing said water-soluble phosphonate an effective amount of a compound in a weight ratio of from about 1:10 to about 10:1 of said phosphonate to said compound selected from the group consisting of alkyl alcohols having at least four carbon atoms, alkyl carboxylic acids, alkylamides, alkylamines, dimethyl sulfoxide, lauryl sulfate, and combinations thereof.

8. The method of claim 7 wherein the aqueous system is a cooling tower.

9. The method of claim 8 wherein the compound is added to the cooling tower waters in the contact loop at a point prior to or simultaneously with the addition of ozone into the contact loop.

10. The method of claim 7 wherein the alkyl alcohol having at least four carbon atoms is selected from the group consisting of t-butanol, t-amyl alcohol, pinacol, 1,6-hexane diol, n-butoxyethanol, 1,-12 dodecanediol, t-butyl amino ethanol and n-butanol.

11. The method of claim 7 wherein the alkyl carboxylic acid is selected from the group consisting of succinic acid, propionic acid, adipic acid, citric acid, 2-hydroxy isobutyric acid, trimethyl acetic acid, N-t-butoxy carbonyl glycine and acetic acid.

12. The method of claim 7 wherein the alkylamine is t-butylamine.

13. A method for increasing the effectiveness of ozone treatment in an aqueous system wherein the aqueous system contains an effective amount of ozone to control microbiological growth, and an effective amount of a water soluble additive selected from the group consisting of water-soluble phosphorares and water-soluble polymers, to prevent hardness precipitation, which comprises the step of adding to the aqueous system an effective amount of a compound in a weight ratio of from about 1:10 to about 10:1 of said water-soluble additive to said compound selected from the group consisting of alkyl alcohols having at least four carbon atoms, alkyl carboxylic acids, alkyl amides, alkylamines, dimethyl sulfoxide, lauryl sulfate, and combinations thereof.

14. The method of claim 13 wherein the aqueous system is a cooling tower.

15. The method of claim 14 wherein the compound is added to the cooling tower waters in the contact loop at a point prior to or simultaneously with the addition of ozone into the contact loop.

16. The method of claim 13 wherein the alkyl alcohol having at least four carbon atoms is selected from the group consisting oft-butanol, t-amyl alcohol, pinacol, 1,6-hexane diol, n-butoxyethanol, 1,-12 dodecanediol, t-butyl amino ethanol and n-butanol.

17. The method of claim 13 wherein the alkyl carboxylic acid is selected from the group consisting of succinic acid, propionic acid, adipic acid, citric acid, 2-hydroxy isobutyric acid, trimethyl acetic acid, N-t-butoxy carbonyl glycine and acetic acid.

18. The method of claim 13 wherein the alkylamine is t-butylamine.

* * * * *

UNITED STATES PATENT AND TRADEMARK OFFICE
CERTIFICATE OF CORRECTION

PATENT NO. : 5,662,803
DATED : 9/2/97
INVENTOR(S) : Paul R. Young

It is certified that error appears in the above-indentified patent and that said Letters Patent is hereby corrected as shown below:

Column 13, Line 26, Claim 13 phosphorares and water-soluble polymers, to prevent hard-

"LETTERS PATENT SHOULD READ AS:"

--phosphonates and water-soluble polymers, to prevent hard- --

Column 14, Line 16, Claim 16 consisting oft-butanol, t-amyl alcohol, pinacol, 1.6-hexane

"LETTERS PATENT SHOULD READ AS:"

--consisting of t-butanol, t-amyl alcohol, pinacol, 1.6-hexane--

Signed and Sealed this

Seventh Day of April, 1998

Attest:

BRUCE LEHMAN

Attesting Officer

Commissioner of Patents and Trademarks